US011334871B2

(12) United States Patent
Yoo

(10) Patent No.: US 11,334,871 B2
(45) Date of Patent: May 17, 2022

(54) APPARATUS, METHOD AND PROGRAM FOR PROVIDING FINANCIAL TRANSACTION BY VIRTUAL CARD NUMBER

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 0 days.

(21) Appl. No.: 17/006,455

(22) Filed: Aug. 28, 2020

(65) Prior Publication Data
US 2021/0065163 A1    Mar. 4, 2021

(30) Foreign Application Priority Data

Aug. 30, 2019 (KR) ........................ 10-2019-0107065
Jun. 26, 2020 (KR) ........................ 10-2020-0078643

(51) Int. Cl.
| | |
|---|---|
| *G06Q 20/34* | (2012.01) |
| *G06Q 20/32* | (2012.01) |
| *G06Q 20/02* | (2012.01) |
| *G06Q 20/36* | (2012.01) |
| *G06Q 20/38* | (2012.01) |
| *G06Q 20/40* | (2012.01) |
| *H04L 9/32* | (2006.01) |

(52) U.S. Cl.
CPC .......... *G06Q 20/351* (2013.01); *G06Q 20/02* (2013.01); *G06Q 20/321* (2020.05); *G06Q 20/3674* (2013.01); *G06Q 20/385* (2013.01); *G06Q 20/3821* (2013.01); *G06Q 20/4018* (2013.01); *H04L 9/3234* (2013.01); *G06Q 2220/00* (2013.01)

(58) Field of Classification Search
CPC .... G06Q 20/351; G06Q 20/321; G06Q 20/02; G06Q 20/3674; G06Q 20/3821; G06Q 20/385; G06Q 20/4018; H04L 9/3234
USPC ........................................................... 705/44
See application file for complete search history.

(56) References Cited

U.S. PATENT DOCUMENTS

| | | | |
|---|---|---|---|
| 2019/0034914 A1 | 1/2019 | Kumawat et al. | |
| 2019/0095913 A1* | 3/2019 | Van Puyveld | ......... G06Q 20/24 |

(Continued)

FOREIGN PATENT DOCUMENTS

| | | | | |
|---|---|---|---|---|
| CA | 2890335 A1 * | 5/2014 | ........... G06Q 20/326 |
| KR | 10-2002-0096353 A | 12/2002 | |

(Continued)

OTHER PUBLICATIONS

"Security Aspects of Mobile Based E Wallet," by G. Kanimozhi and K.S. Kamatchi. International Journal on Recent and Innovation Trends in Computing and Communication (IJRITCC). vol. 5: Issue: 6. pp. 1223-1228. Jun. 2017. (Year: 2017).*

*Primary Examiner* — Sara C Hamilton
(74) *Attorney, Agent, or Firm* — Studebaker & Brackett PC

(57) ABSTRACT

Embodiments of the inventive concept described herein relate to a virtual card number-based financial transaction apparatus, a virtual card number-based financial transaction providing method, and a virtual card number-based financial transaction providing program, and more particularly, relate to an apparatus, method, and program that may provide a user with an electronic wallet service in an environment where an infrastructure of a financial transaction service is not established.

13 Claims, 9 Drawing Sheets

(56) References Cited

U.S. PATENT DOCUMENTS

| | | | |
|---|---|---|---|
| 2019/0164166 A1* | 5/2019 | Kinch | G06Q 20/3823 |
| 2019/0213578 A1* | 7/2019 | Reijkens | G06Q 20/40 |
| 2019/0362339 A1* | 11/2019 | Gurunathan | G06Q 20/363 |
| 2021/0279734 A1* | 9/2021 | Khatwani | G06Q 20/4097 |

FOREIGN PATENT DOCUMENTS

| | | | |
|---|---|---|---|
| KR | 10-0441118 B1 | 7/2004 | |
| KR | 10-1316466 B1 | 10/2013 | |
| KR | 10-2014-0095745 A | 8/2014 | |
| KR | 10-2015-0082564 A | 7/2015 | |
| KR | 10-2016-0036471 A | 4/2016 | |
| KR | 10-2019-0016878 A | 2/2019 | |
| KR | 10-2019-0055039 A | 5/2019 | |
| WO | WO-2020009944 A1 * | 1/2020 | G06Q 20/4097 |

* cited by examiner

100

300

APPARATUS, METHOD AND PROGRAM FOR PROVIDING FINANCIAL TRANSACTION BY VIRTUAL CARD NUMBER

CROSS-REFERENCE TO RELATED APPLICATIONS

A claim for priority under 35 U.S.C. § 119 is made to Korean Patent Application Nos. 10-2019-0107065 filed on Aug. 30, 2019 and 10-2020-0078643 filed on Jun. 26, 2020 in the Korean Intellectual Property Office, the entire contents of which are hereby incorporated by reference.

BACKGROUND

Embodiments of the inventive concept described herein relate to a virtual card number-based financial transaction apparatus, a virtual card number-based financial transaction providing method, and a virtual card number-based financial transaction providing program, and more particularly, relate to an apparatus, method, and program that may provide a user with an electronic wallet service in an environment where an infrastructure of a financial transaction service is not established.

Code-type data is being used in a lot of fields. In addition to the card number or account number used to make a payment, the code-type data includes an IPIN number, a resident registration number, or the like for user identification.

However, the code data may be leaked when such the code data is used. In the case of a card number, because the actual card number is recorded on the card surface as it is, the actual card number is visually exposed to other people. Upon making a payment using a magnet, the card number is leaked to other people while being transmitted to a POS device.

The virtual card number was used to prevent the actual card number from being leaked. However, data for identifying a user is needed to search for the actual card number corresponding to the virtual card number. For example, the code of One Time Password (OTP) is changed and generated every time. However, in the case of OTP, a login procedure is needed to determine the algorithm assigned to the user, and it is difficult for OTP to be applied to various fields.

Accordingly, there is a need for a device capable of searching for the actual card number based on the virtual card number changed in real time, while not providing the identification information about a user or a device corresponding to the actual card number.

There is a prior art disclosed as Korean Registered Patent No. 10-1316466 on Oct. 1, 2013.

SUMMARY

Embodiments of the inventive concept provide a financial transaction apparatus, a virtual card number-based financial transaction providing method, and a financial transaction providing program that may provide a financial transaction service to an electronic wallet service subscriber in an environment where a payment infrastructure of the electronic wallet service is not established.

Embodiments of the inventive concept provide a financial transaction apparatus, a virtual card number-based financial transaction providing method, and a financial transaction providing program that may not expose the actual credit card number stored in the electronic wallet system.

The technical problems to be solved by the present inventive concept are not limited to the aforementioned problems, and any other technical problems not mentioned herein will be clearly understood from the following description by those skilled in the art to which the inventive concept pertains.

The inventive concept for solving the above-described problems provides a financial transaction providing method performed by a verification server.

According to an exemplary embodiment, a virtual card number-based financial transaction providing method by a verification server includes receiving, by the verification server, a virtual card number provided by a virtual card number generation means, from a financial transaction terminal, searching, by the virtual card number verification means, for a matching code, using a plurality of detailed codes included in the virtual card number, transmitting, by the verification server, the virtual card number or the matching code to one wallet server of a plurality of wallet servers storing in an actual card number, based on the matching code, receiving the actual card number corresponding to the virtual card number from the one wallet server, and performing, by the verification server, a financial transaction progress or a financial transaction progress request, to the received actual card number.

In an embodiment, the virtual card number may include a fixed code coupled at a predetermined location within the virtual card number and matched with the verification server, and the plurality of detailed codes.

In an embodiment, the verification server may transmit the virtual card number to the one wallet server, and the one wallet server may include a virtual card number verification means.

In an embodiment, the matching code may include only information associated with one wallet server of the plurality of wallet servers.

In an embodiment, the verification server may transmit the matching code to the one wallet server.

In an embodiment, the matching code may include a storage location of the actual card number stored in the one wallet server, or a UID stored in the one wallet server.

In an embodiment, the inventive concept may further include verifying, by the virtual card number verification means, validity of the virtual card number based on the plurality of detailed codes and a generation security code generated in the virtual card number verification means. The transmitting, by the verification server, of the virtual card number or the matching code to the one wallet server of the plurality of wallet servers storing in the actual card number based on the matching code may be performed only when the virtual card number is valid.

In an embodiment, a first virtual card number and a second virtual card number may include the same fixed code such that the first virtual card number formed based on a first matching code matched with one wallet server of the plurality of wallet servers, and the second virtual card number formed based on a second matching code matched with another wallet server of the plurality of wallet servers are transmitted to the verification server.

In an embodiment, the virtual card number may be generated by a user terminal or a wearable device including the virtual card number generation means, and the user terminal or the wearable device may be registered in one wallet server of the plurality of wallet servers.

In an embodiment, a user terminal or a wearable device registered in one wallet server of the plurality of wallet servers, and a user terminal or a wearable device registered in another wallet server of the plurality of wallet servers may generate a virtual card number including the same fixed code.

Furthermore, the inventive concept provides a virtual card number-based financial transaction providing program stored in a medium to perform the above-described method.

According to an exemplary embodiment, a virtual card number-based financial transaction providing apparatus includes a communication unit transmitting or receiving data with another server or terminal, a detailed code extraction unit searching for a matching code based on a plurality of detailed codes included in a virtual card number received from a virtual card number generation means, and a wallet server selection unit selecting one wallet server of a plurality of wallet servers storing an actual card number, based on the matching code, and controlling the communication unit such that the virtual card number or the matching code is transmitted to the selected wallet server. The communication unit receives the actual card number corresponding to the virtual card number from the one wallet server, and performs a financial transaction progress or a financial transaction progress request with the actual card number.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
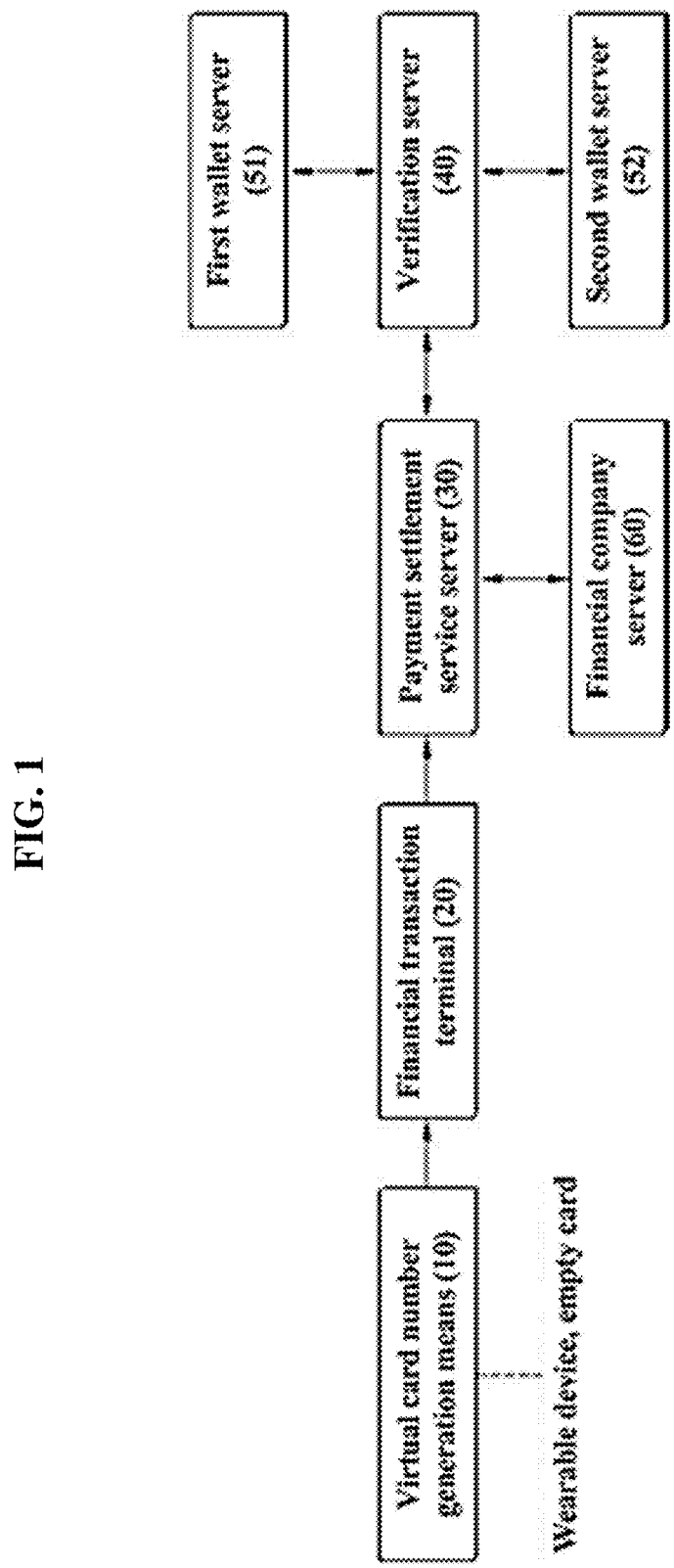
FIG. 1 is an exemplary diagram of a financial transaction providing system, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the concept of the inventive concept to those skilled in the art. The inventive concept may be defined by scope of the claims. Meanwhile, the terminology used herein to describe embodiments of the inventive concept is not intended to limit the scope of the inventive concept.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements.

In this specification, a 'financial transaction' refers to the procedure that takes place between finance companies. The 'financial transaction' includes card payments, deposits or withdrawals from a bank account, or the like.

In this specification, a 'character' is a component of a code and includes all or part of uppercase alphabet characters, lowercase alphabet characters, numerals, and special characters.

In this specification, a 'code' refers to a string of characters.

In this specification, a 'card number' is used for a financial transaction such as a payment, or the like and refers to the number issued to a card and delivered to a card issuer in the case of a payment, the cancellation of a payment, or the like.

In this specification, an 'actual card number' is the number issued by the card issuer to the card of a specific user. That is, the 'actual card number' may mean a number issued for a general actual card, a mobile card, or the like.

In this specification, a 'virtual card number' may be a card number temporarily generated to be connected to the actual card number and may be a code of specific digits composed of characters including numbers.

In this specification, a 'detailed code' refers to a part of codes included in the virtual card number. That is, when the virtual card number is generated by combining the separately generated a plurality of code, the detailed code refers to a respective code constituting the virtual card number after the respective code is separately generated.

In this specification, a 'matching code' is a value found in a verification algorithm using a virtual card number or at least one detailed code constituting the virtual card number; the 'matching code' refers to a code used to search for the actual card number storage location. The format of the matching code may vary depending on the actual card number storage location search method.

In this specification, the 'unit count' is a unit set to a specific time interval and is defined to change as the time interval elapses. For example, 1 count may be used after being set to a specific time interval (e.g., 1.5 seconds).

In this specification, a 'virtual card number generating function' refers to the function used to generate the virtual card number.

In this specification, 'rolling movement' means that an object performs both rotational and translational movements. That is, the 'rolling movement' moves while performing both rotational and translational movements, and means that each point of the rotating object moves in contact with the moving axis sequentially.

In this specification, the 'electronic wallet service' refers to a service that separately stores information about a subscriber's card (e.g., a credit card, a check card, or a debit card) and utilizes the stored credit card for financial transactions. Each electronic wallet service includes a wallet server storing information about subscribers. The wallet server will be described later.

Hereinafter, according to an exemplary embodiment of the inventive concept, the configuration of the actual card number will be described to explain the process of generating a virtual card number to substitute the actual card number and the process of searching for an actual card number.

The 'actual card number' includes at least one of a card identification number, a card security code, or an expiration date. The card identification number is the code assigned to identify a card issuer, a card type, and a user of a card. Generally, the card identification number provided to a card has 15 or 16 digits. Moreover, In general, in the case of the card identification number of 16 digits, the first six digits are composed of the issuer identification number (IIN) of the card; the digits from the seventh digit to the fifteenth digit are composed of code provided by each card issuer to each card depending on an arbitrary rule; the 16th digit is composed of a value for verifying the card identification number by a specific formula.

The card security code is composed of the numbers on specific digits (e.g., 3 digits in the case of Visa or Master card and 4 digits in the case of AMEX card) printed on one side of the card, and is a code for determining whether the card number is normal. That is, in the case where the card security code has 3 digits and the card identification number has 16 digits, when 3-digit code being the card security code and 16-digit code being the card identification number are encrypted/decrypted depending on a predetermined rule and then the card is a normal card, when the corresponding value is matched. The card security code is referred to as a Card Verification Value (CVV) for Visa, Card Validation Code (CVC) for Master Card/JCB, and Confidential Identifier Number or Card Identification Number (CID) or American Express.

The expiration date refers to the date usable after which the actual card number is issued. Generally, the expiration date is composed of four digits having two digits for each year or month. Because the magnetic card includes the actual card number as it is, the whole card number may be leaked by only reading out the magnetic card. The use of magnetic cards has been recently restricted over the world, and the magnetic card is being converted into a high-security card like an IC card. For the purpose of applying other high-security methods, a new terminal needs to be installed or the magnetic card needs to be changed to be different from the conventional process. Accordingly, a method for preventing a card number leakage is needed while the same process is applied using the conventional actual card number. In particular, it is necessary to improve security while the conventional magnetic card reader is used as it.

Hereinafter, according to an embodiment of the inventive concept, a virtual card number-based financial transaction providing system, a virtual card number-based financial transaction providing method, and a virtual card number-based financial transaction providing program will be described in detail with reference to drawings.

Hereinafter, embodiments of the inventive concept will be described in detail with reference to accompanying drawings.

FIG. 1 is an exemplary diagram of a financial transaction providing system, according to an embodiment of the inventive concept.

Referring to FIG. 1, according to an embodiment of the inventive concept, a virtual card number-based financial transaction providing system includes a virtual card number generation means 10, a payment settlement service server 30, a verification server 40, a plurality of wallet servers 51 and 52, and a financial company server 60.

The virtual card number generation means 10 generates a virtual card number including information that allows the verification server 40 or the plurality of wallet servers 51 and 52 to search for an actual card number. That is, the virtual card number generation means 10 generates a virtual card number depending on the virtual card number generation function. At this time, because the verification server 40 or the plurality of wallet servers 51 and 52 search for an actual card number based on the virtual card number, the virtual card number generation means may not store the actual card number. In this way, the actual card number may be prevented from leaking through the hacking of the virtual card number generation means 10. The detailed description about the virtual card number generation function will be given later.

When the payment is made in a financial transaction terminal 20 with the virtual card number generation means 10 or in a web-page or application, a payment settlement service server (e.g., it may be a PG server or a payment network company server, but is not limited thereto) receives a virtual card number.

The payment settlement service server 30 refers to a server held by a payment settlement service company. The payment settlement service company (e.g., VISA, MASTERCARD, or the like) refers to a company that establishes global or local networks to allow credit card issuers and electronic wallet services to provide financial transaction services. In particular, the payment settlement service company refers to a service company that may issue the BIN to a credit card issuer or electronic wallet service company, may transmit a card number to a server corresponding to the BIN included in the card number received as the user makes a payment, and may make financial transactions. The payment settlement service server 30 held by the payment settlement service company stores the BIN issued for a specific service and transmits and receives a card number to allow financial transactions to be made.

For example, the payment settlement service server 30 transmits the received virtual card information to the server corresponding to the BIN, based on the BIN (a fixed code) included in the virtual card number.

The conventional process for the electronic wallet service (wallet service) to use the payment network of a payment settlement service is as follows.

According to the conventional process, the electronic wallet service needs to be registered in the payment settlement service company, for the wallet server to receive the card number from the payment settlement service server 30. Specifically, the electronic wallet service pays a predetermined cost to a payment settlement service company and receives a BIN. The issued BIN is stored in the payment settlement service server 30; when the payment settlement service server 30 receives a card number including the issued BIN, the payment settlement service server 30 transmits the received card number to the wallet server corresponding to the electronic wallet service. As described above, the fact that the electronic wallet service is registered in the payment settlement service company mean that the electronic wallet service has received a BIN from the payment settlement service company.

Furthermore, in this specification, the fact that the electronic wallet service has received the BIN from the payment settlement service company means that the electronic wallet service has established an infrastructure capable of making overseas payments using a global payment network service. The electronic wallet service may receive the BIN from the payment settlement service company and then may provide financial transaction services to a user within the network range established by the payment settlement service company. For example, when the electronic wallet service is registered in a payment settlement service company establishing a global network, the electronic wallet service may provide financial transaction services to a user within the global network range.

The wallet server corresponding to the electronic wallet service registered in the payment settlement service company receives the virtual card number from the payment settlement service server 30 and searches for the actual card information stored in the wallet server, using the received virtual card number. Afterward, the found actual card number is transmitted to the payment settlement service server 30. Afterward, the payment settlement service server 30 makes a financial payment, using the received actual card number. As described above, the wallet server may receive the virtual card number from the virtual card number generation means 10, using the conventional payment process instead of the actual card number. That is, when the virtual card number is generated as a code having a length the same as the length of the actual card number, a virtual card number-based financial transaction providing method according to an embodiment of the inventive concept may be applied to a process proceeding from the virtual card number generation means to a card issuer's server including the virtual card number verification means without changes.

However, a wallet service (an electronic wallet service) has a high cost to receive a BIN from a global payment settlement service company, to provide a global payment using payment network, and the issuance conditions are also difficult. In particular, the electronic wallet service company needs to be registered in the payment settlement service company establishing a global network to expand a service area. However, receiving a BIN from the payment settlement service company establishing a global network is expensive and the issuance conditions are difficult. Accordingly, a local electronic wallet service is restricted from expanding the service area.

It is difficult for an electronic wallet service provider to directly receive a BIN for using the global payment network from a payment settlement service company. The electronic wallet service provider may provide overseas payments, using a global payment network through a service server (the verification server 40 to be described later) linking global payments.

In particular, when the specific electronic wallet service is not registered in the payment settlement service company, the wallet server corresponding to the specific electronic wallet service may not receive the virtual card number. Accordingly, a subscriber subscribed to the specific electronic wallet service may not use the electronic wallet service. In other words, the electronic wallet service company needs to establish its own local network such that an electronic wallet service not registered in the payment settlement service company provides a financial transaction service to a user. The electronic wallet service company may not provide the financial transaction service in an area outside the established local network. Accordingly, the payment connection service server (i.e., a verification server) supports overseas payments of one or more electronic wallet services, based on the BIN issued by itself to expand the electronic wallet service, which is capable of being used for local payments, to overseas payments.

To this end, the inventive concept may allow an electronic wallet service not registered in a payment settlement service company to provide a financial transaction service to the corresponding service subscriber. To this end, the inventive concept includes a verification server 40.

The verification server 40 receives a virtual card number (e.g., a variable virtual card number or a fixed virtual card number) from the payment settlement service server 30 based on the BIN issued by itself and then links the wallet service to return the actual card number of a user attempting to make a payment, to the payment network.

In an embodiment, the verification server 40 receives the virtual card number from the payment settlement service server 30 instead of the wallet server, and delivers the received virtual card number to the wallet server or delivers the matching code found based on the received virtual card number to the wallet server.

To this end, a company (i.e., a payment connection service operator) equipped with the verification server 40 needs to obtain a BIN corresponding to the verification server 40 from a payment settlement service company. When the virtual card number includes a specific BIN, the payment settlement service server 30 transmits the virtual card number to the verification server 40.

In an embodiment, the verification server 40 searches for the matching code based on the virtual card number. That is, the virtual card number is used to search for the matching code in the verification server. For example, the verification server 40 stores the matching code for linking with the wallet server in a location allocated to each user in a virtual card number verification algorithm.

For example, when the virtual card number is a one-time virtual card number changed in unit time intervals, the verification server 40 receives a virtual card number to extract a plurality of detailed codes, and searches for a specific user allocation location (e.g., UID) based on a plurality of detailed codes to extract a matching code matched thereto. The matching code includes specific wallet identification information. In addition, the matching code may further include user identification information. For example, as described later, when the verification server transmits the matching code to the specific wallet server, the matching code may further include user identification information.

Besides, the matching code may include identification information of a specific card registered by a specific user in a specific wallet.

The verification server transmits the found matching code or virtual card number to one of a plurality of wallet servers registered in the verification server 40. Furthermore, the verification server 40 verifies whether the virtual card number is a code normally generated by the virtual card number generation means 10. The detailed description about the method in which the virtual card number verification means determines whether a virtual card number is normal will be given later.

The verification server 40 may receive the virtual card number from the virtual card number generation means 10 in various manners. In an embodiment, the verification server 40 may receive the virtual card number that is received by a financial transaction terminal from the virtual card number generation means 10 via wireless communication. For example, when a virtual card number generation apparatus 100 including the virtual card number generation means 10 includes an NFC antenna module, a Bluetooth communication module, or the like, the virtual card number generation apparatus 100 may transmit the virtual card number to be delivered to the verification server 40, to the financial transaction terminal 20 through communication with the financial transaction terminal 20.

In the meantime, the verification server 40 and the virtual card number generation means 10 may include all or part of virtual card number generation functions. As the verification server 40 and the virtual card number generation means 10 identically include a virtual card number combining function included in the virtual card number generation function (i.e., a function to generate a virtual card number by combining detailed codes depending on specific rules), the verification server 40 may properly extract a plurality of detailed codes in the virtual card number generated by the virtual card number generation means 10.

Moreover, in an embodiment, the verification server 40 may verify whether the received virtual card number is generated and received by the normal virtual card number generation means 10. That is, the verification server 40 may perform verification by comparing the code (i.e., a virtual card number or a specific detailed code) received by the virtual card number generation means 10 after a code (i.e., a virtual card number or a specific detailed code) is generated under the condition the same as the condition in the case of the virtual card number generation means 10.

However, an embodiment is not limited thereto, and the verification server 40 and the virtual card number generation means 10 may not include the same virtual card number generation function. In particular, the virtual card number generation means 10 may include a virtual card number generation function, and the verification server 40 may include a verification algorithm. Even in this case, the verification server may perform verification of the virtual card number.

The verification server 40 searches for a matching code based on a plurality of detailed codes included in the virtual card number and transmits the virtual card number or the matching code to one of the plurality of wallet servers 51 and 52 based on the matching code. Here, each of the plurality of wallet servers 51 and 52 refers to a server corresponding to a different electronic wallet service.

Each of the plurality of wallet servers 51 and 52 receives the virtual card number or matching code from the verification server 40, and then searches for the stored actual card number based on the received virtual card number or matching code. Afterward, the wallet server transmits the found actual card number to the verification server 40. The verification server transmits the received actual card number to the payment settlement service server 30 such that the financial transaction is made.

In particular, for example, when the wallet server receives the matching code from the verification server, the wallet server searches for a user corresponding to the matching code, and extracts one of a plurality of actual card numbers registered by the user to transmit the extracted one to the verification server. To this end, the verification server and the wallet server may share the matching code through communication when a new user desires registration, and the verification server may transmit the information (UID) of a user allocation area storing the matching code to the wallet server.

Moreover, for another example, when the matching code includes identification information of a specific card registered by a specific user in a specific wallet, the wallet server searches for the actual card number corresponding to the matching code and transmits the found result to the verification server. To this end, a user client or application may generate a one-time variable virtual card number distinguished for each actual card number of a user, and the verification server searches for the matching code corresponding to the user's specific actual card number based on the received one-time variable virtual card number and transmits the found result to the wallet server.

Furthermore, for another example, when the wallet server receives the one-time variable virtual card number from the verification server as it is, the verification server identifies wallet information for delivering the virtual card number based on the virtual card number through the found matching code, and the wallet server receives the virtual card number from the verification server, and then searches for a user or an actual card number of the user based on a plurality of detailed codes in the virtual card number. To this end, the verification server needs to provide a virtual card number verification module to the wallet server.

Furthermore, in another embodiment, when the verification server transmits the matching code to the wallet server, the verification server may receive a fixed virtual card number and a variable virtual card number, and then may transmit the matching code to the wallet server.

The fixed virtual card number may be a card number included in the physical card for a wallet or a virtual card number generated by an application for a periodic payment. More specifically, when a payment is possible in a financial transaction terminal equipped with an IC reader and an NFC reader and a physical wallet card including a card number different from the actual card number is connected to a wallet service, users may utilize the physical wallet card upon making a payment. As the virtual card number included in the physical wallet card includes the BIN received from the payment network, the verification server receives the fixed virtual card number of the physical wallet card through the payment network. The verification server searches for the matching code corresponding to the fixed virtual card number and transmits the found result to the wallet server by mapping the user's fixed virtual card number and the matching code.

Furthermore, as another specific example, the user generates the fixed virtual card number with a validity period in the wallet service to register a periodic payment (e.g., a payment for a subscription service such as Netflix). At this time, the verification server receives information (including an expiration date when the expiration date is set) about the user's matching code and the generated fixed virtual card number from the wallet server, and then maps the fixed virtual card number for a periodic payment onto the received matching code. When a user makes a request for a payment with the fixed virtual card number at a specific time to a service registering the fixed virtual card number for a periodic payment, as the fixed virtual card number includes the BIN capable of using the payment network, the verification server receives the fixed virtual card number and searches for a matching code corresponding to the fixed virtual card number. The verification server transmits the found matching code to the wallet server.

Furthermore, as another specific example, when the user utilizes a one-time variable virtual card number for online or offline payment, as the one-time variable virtual card number includes BIN capable of using the payment network, the verification server receives the one-time variable virtual card number from the payment network and searches for user allocation information (user ID (UID)) based on a plurality of detailed codes extracted from the one-time variable virtual card number to extract the matching code matched with the UID. The verification server transmits the matching code to the wallet server corresponding to the matching code extracted from the virtual card number verification algorithm.

In this way, the global payment connection service server not only expands the local payment of the electronic wallet service to overseas payment online/offline, but also uses the conventional payment method, but is not limited to the payment method provided by each electronic wallet service. In addition to a partner where a wallet service is affiliated, the global payment connection service server is connected to make a payment using a virtual card number.

Hereinafter, the above-described configurations will be described in detail with reference to the following drawings.

Figure 2:
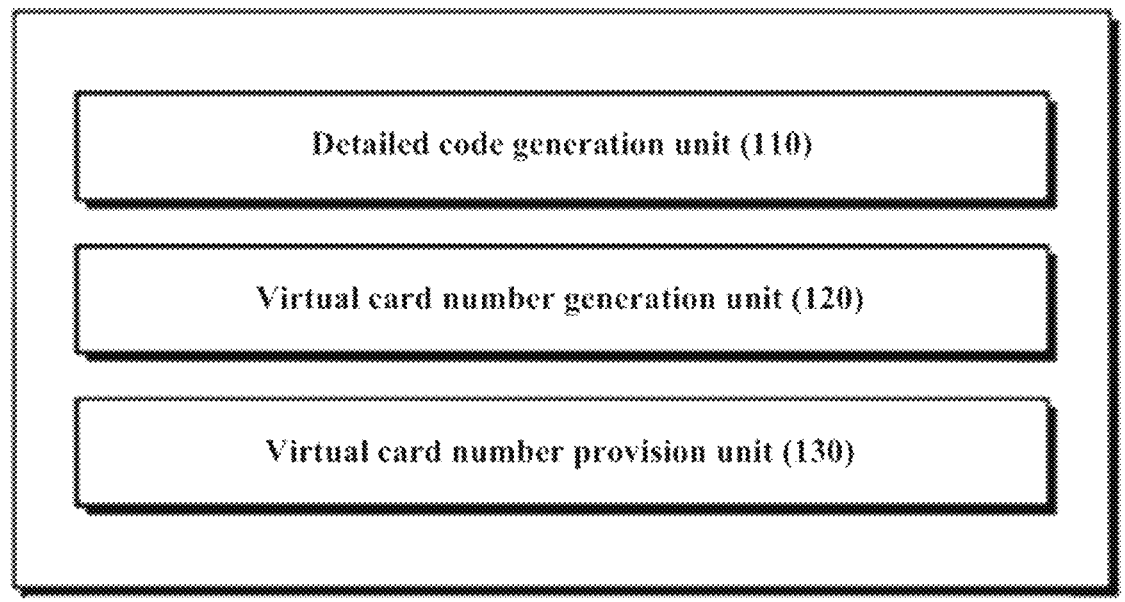
FIG. 2 is a configuration diagram of a virtual card number generation apparatus, according to another embodiment of the inventive concept.

FIG. 2 is a configuration diagram of the virtual card number generation apparatus, according to another embodiment of the inventive concept.

Referring to FIG. 2, according to another embodiment of the inventive concept, the virtual card number generation apparatus 100 includes a detailed code generation unit 110, a virtual card number generation unit 120, and a virtual card number provision unit 130.

According to embodiments of the inventive concept, the virtual card number generation apparatus 100 may be a device, in which the program corresponding to the virtual card number generation means 10 is embedded or in which a program corresponding to the virtual card number generation means 10 is installed. For example, the virtual card number generation apparatus 100 may be a smart card equipped with the program corresponding to the virtual card number generation means 10. Moreover, for example, the virtual card number generation apparatus 100 may be a mobile terminal in which an app card application corresponding to the virtual card number generation means 10 is installed. In addition to the above-described illustration, the virtual card number generation apparatus 100 may be a device that generates and transmits a virtual card number. For a more specific example, the virtual card number generation apparatus 100 may be a wearable device in which an app card application corresponding to the virtual card number generation means 10 is installed.

The virtual card number generation unit 120 may generate the virtual card number by combining one or more detailed codes. According to an embodiment, the virtual card number may be generated by combining a plurality of detailed codes depending on a specific rule. The virtual card number generating function includes the rule (i.e., the detailed code combining function) to combine a plurality of detailed codes.

Various methods may be applied to the method of generating one virtual card number by combining the plurality of detailed codes. As the example of the detailed code combining function, the virtual card number generation unit 120 may generate the virtual card number in the manner of alternately positioning the first code of N-digits and the second code of N-digits. Furthermore, for another example, the detailed code combining function may be a function to combine the second code behind the first code. As the length of the detailed code included in a virtual function increases, the detailed code combining function may be generated variously.

The detailed code generation unit 110 may generate one or more detailed codes. The virtual card number generation function includes each detailed code generation function. For example, the virtual card number generation function generates a plurality of detailed codes, using a plurality of detailed codes generation functions and generates a virtual card number, using the detailed code combining function to combine the plurality of detailed codes.

In an embodiment, the detailed code generation unit 110 includes a first function and a second function as detailed code generation functions to generate a first code and a second code. The first code and the second code may have the correlation for searching for a wallet server transmitting a virtual card number in the verification server 40 including a virtual card number verification means. However, the virtual card number generation apparatus 100 may only include the first function to generate the first code and the second function to generate the second code through the detailed code generation functions to improve security, and may not include the data about the correlation between the first code and the second code.

Furthermore, in another embodiment, the detailed code generation unit 110 may generate at least one of the first and second codes, using the matching code stored in the virtual card number generation apparatus 100. Here, the matching code is a code matched with a specific wallet server, and the verification server 40 determines a wallet server to transmit the matching code, using a virtual card number based on the matching code. In the meantime, the matching code may include at least one of information associated with one of the plurality of wallet servers, the storage location of the actual card number stored in the one wallet server, and the UID stored in the one wallet server. The verification server 40 stores the matching code and the location of the wallet server that matches with the matching code.

Meanwhile, an embodiment according to the inventive concept may be changed depending on information included in the matching code.

In an embodiment, when the matching code includes only information associated with one of a plurality of wallet servers, the verification server 40 transmits a virtual card number to the one wallet server based on the matching code. In this case, the one wallet server needs to be equipped with a virtual card number verification means to search for the actual card number.

Also, in another embodiment, the matching code may include information associated with one of the plurality of wallet servers and the storage location of the actual card number stored in the one wallet server. In this case, the verification server 40 determines the wallet server to transmit the matching code based on the matching code, and transmits the actual card number storage location to the corresponding wallet server.

Moreover, in another embodiment, the matching code may not include the actual card number storage location in the wallet server, and may include the information associated with one of a plurality of wallet servers and the UID registered in the one wallet server. Here, the UID itself may include information associated with one of a plurality of wallet servers. In this case, the verification server 40 determines the wallet server to transmit the detailed code based on the UID, and transmits the UID to the corresponding wallet server.

Meanwhile, the matching code may include the UID itself or the storage location of the UID. When the matching code includes the UID itself, after receiving the matching code from the verification server 40, the wallet server searches for the actual card number stored after being matched with the UID. On the other hand, when the matching code includes the storage location of the UID, the wallet server receives the matching code from the verification server 40, searches for the UID using the matching code, and searches for the actual card number stored after being matched with the UID.

Furthermore, in another embodiment, the matching code is stored in each of the virtual card number generation apparatus 100 and the verification server 40 to verify the validity of a virtual card number to be described later. The matching code may be allocated when the user registers user information in the electronic wallet service; the wallet server transmits the allocated matching code to the virtual card number generation apparatus 100 and the verification server 40. This will be described in more detail later.

Moreover, according to another embodiment, the virtual card number may include the unchanged fixed code for distinguishing groups, together with a plurality of detailed codes. The fixed code may be combined at the predetermined location within the virtual card number. In the case where the virtual card number generating function is assigned for each card type group, the virtual card number verification means may determine a card type group only when extracting the fixed code from the virtual card number first. Accordingly, the fixed code may be combined at predetermined location (e.g., a location the same as the BIN of the actual card number) within the virtual card number to be detachable without the separate function. The fixed code may be matched with the verification server 40, and may allow the verification server 40 to receive a virtual card number.

Moreover, according to an embodiment, the virtual card number generation apparatus 100 may generate the detailed code to be the code of the same digits as the actual card number by combining a plurality of detailed codes and the fixed code. The virtual card number generation apparatus 100 needs to generate a code having the same digits as the actual card number, as the virtual card number to use the virtual card number while the conventional financial transaction system (e.g., when the financial transaction is a payment in a store, a POS device and a PG server) is maintained as it is. To this end, the virtual card number generation apparatus 100 utilizes the digits of a plurality of detailed codes by dividing digits other than the fixed code for determining the card issuer and the card type of the corresponding card issuer. For example, when the actual card number has the card identification number of 16 digits and includes the first code and the second code as the detailed code, the virtual card number generation apparatus 100 may generate the first code and the second code, each of which has 5 digits, by identically dividing 10 digits other than the fixed code of 6 digits among 16 digits. Afterward, the virtual card number generation unit to be described later may combine the first code and the second code depending on the specific rule and then may combine the fixed code with the front portion of the card identification number of the actual card number to generate the card identification number of the virtual card number.

The virtual card number provision unit 130 performs a role of outputting the virtual card number to the outside to provide the virtual card number to a virtual card number verification device 200. The virtual card number provision unit 130 may include various components capable of providing the virtual card number to the outside. The virtual card number provision unit 130 includes all or part of a wireless Internet module, a short range communication module, an IC chip, a magnetic field generation unit, a display unit, and the like.

The wireless Internet module is a module for wireless Internet access and may be embedded in a mobile terminal 100 or may be attached on the mobile terminal 100. The wireless Internet technology may include Wireless LAN (WLAN) (Wi-Fi), Wireless broadband (Wibro), World Interoperability for Microwave Access (Wimax), High Speed Downlink Packet Access (HSDPA), long term evolution (LTE), Long Term Evolution-Advanced (LTE-A), or the like. For example, in the case where the virtual card number generation apparatus 100 is a mobile terminal in which an app card application being a virtual card number generation means is installed, when a user purchases an item from a shopping application or a shopping website, the virtual card number generation apparatus 100 may transmit the virtual card number to a payment settlement service server (i.e., the PG server) through wireless Internet communication.

The short range communication module refers to a module for short range communication. The short range communication technology may include Bluetooth, Bluetooth Low Energy (BLE), Beacon, Radio Frequency Identification (RFID), Near Field Communication (NFC), Infrared Data Association (IrDA), Ultra Wideband (UWB), ZigBee, or the like.

When the virtual card number generation apparatus 100 corresponds to a card for transmitting the virtual card number to a POS device, the virtual card number provision unit 130 may include a magnetic field generation unit or an IC chip. The magnetic field generation unit may transmit card data to a card reader by outputting the card data in the form of a magnetic signal. The magnetic field generation unit may include one or more magnetic cells that form a magnetic field through current flow and output the magnetic signal of card information. The magnetic field generation unit may be provided such that the magnetic field generation unit is exposed on the upper or lower surface of a PCB plate along a long side to be adjacent to the specific long side of the PCB plate of the card.

The IC chip may be mounted in PCB and may exchange data by contacting the terminal of IC card reader. That is, the IC chip delivers the virtual card number generated by the virtual card number generation unit 120 to the IC card reader.

The display unit may include at least one of a liquid crystal display, a thin film transistor-liquid crystal display, an organic light-emitting diode, a flexible display, and an E-paper.

The display unit may visually output the virtual card number generated by virtual card number generation unit 120 to the outside. In this way, the user of the virtual card number generation apparatus 100 may visually identify the generated virtual card number in real time and then may enter the visually identified virtual card number into the virtual card number verification means.

For example, when the virtual card number generation device is the smart card, the virtual card number generation apparatus may include a display unit capable of outputting the virtual card number without outputting the card number on the surface of the smart card. Moreover, for example, when the virtual card number includes the fixed code the same as the BIN, the virtual card number generation apparatus 100 may output the BIN on the card surface and may store only the digits of the remaining card number in the display unit. For example, the display unit may be an E-paper, an OLED, or the like or may be a 7-segment display provided at each position. Moreover, for example, when the virtual card generation device is a smartphone in which the app card application is installed, the display unit may be the display unit of the smartphone in which the app card application is executed and is displayed.

Moreover, the user may deliver the virtual card number displayed in the display unit via various paths of a text message. Because the virtual card number (in particular, the code generated while being changed continuously) is delivered such that the virtual card number verification means searches for the actual card number without transmitting the actual card number, the user may not be concerned about the leakage of the actual card number upon transmitting the code through the text message, or the like.

Hereinafter, the virtual card number verification device 200 will be described.

Figure 3:
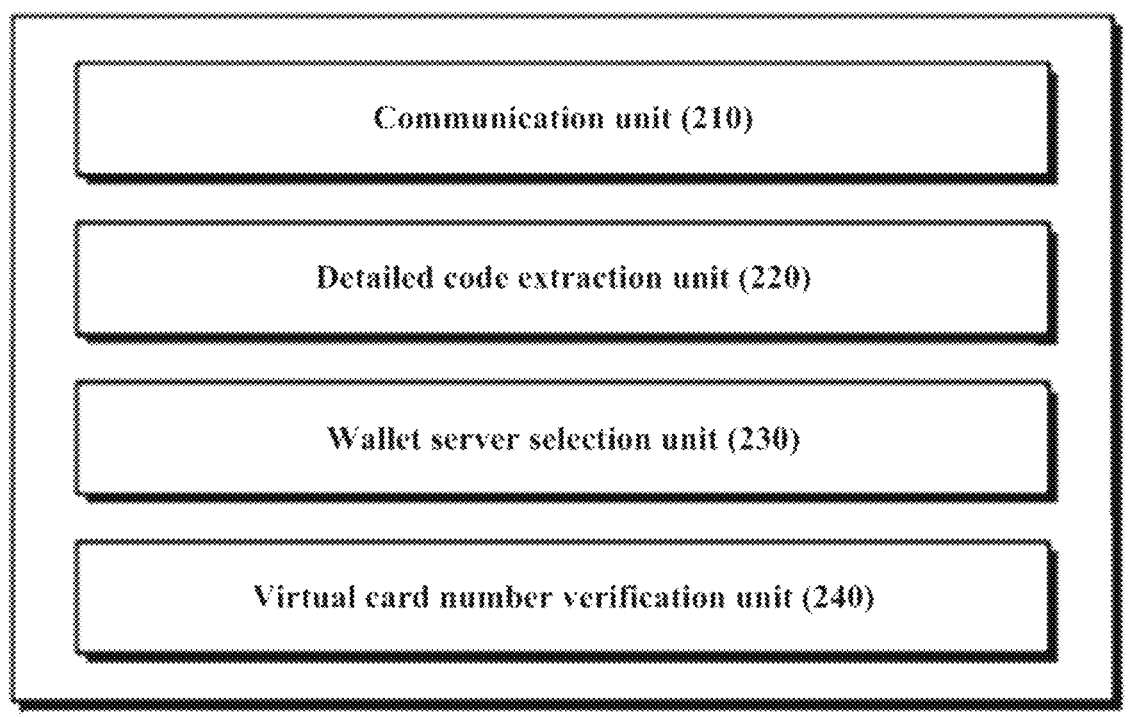
FIG. 3 is a configuration diagram of a virtual card number verification device, according to an embodiment of the inventive concept.

FIG. 3 is a configuration diagram of a virtual card number verification device 200, according to another embodiment of the inventive concept.

Referring to FIG. 3, according to another embodiment of the inventive concept, the virtual card number verification device 200 includes a communication unit 210, a detailed code extraction unit 220, and a wallet server selection unit 230. The virtual card number verification device 200 may be the verification server 40.

For example, in the case of a card payment, the virtual card number verification device 200 receives the virtual card number generated by the virtual card number generation apparatus 100 through a POS device and a PG server.

The communication unit 210 receives the virtual card number from the virtual card number generation apparatus 100. According to an embodiment, the communication unit 210 may receive the virtual card number generated by the virtual card number generation apparatus 100, through the communication with another server (e.g., the payment settlement service server).

The detailed code extraction unit 220 extracts a plurality of detailed codes included in the virtual card number. The virtual card number may be generated by combining a plurality of detailed codes depending on the specific rule. The detailed code extraction unit 220 of the virtual card number verification device 200 may include the detailed code combining function the same as the virtual card number generation apparatus 100 of a specific group, and thus the detailed code extraction unit 220 may extract a plurality of detailed codes from the virtual card number by applying the detailed code combining function. For example, when the virtual card number generation apparatus 100 generates the virtual card number obtained by combining two detailed codes (i.e., the first code and the second code), the detailed code extraction unit 220 may separate the first code and the second code by applying the detailed code combining function to the character string array of the virtual card number.

The wallet server selection unit 230 selects a wallet server to transmit detailed codes based on a plurality of detailed codes. Here, a plurality of wallet servers are servers previously registered in the verification server 40. The correlation may be included between detailed codes for the wallet server selection unit 230 to select a wallet server transmitting a plurality of detailed codes.

When the virtual card number includes the first code and the second code, as an embodiment of having the correlation between detailed codes, the wallet server selection unit 230 may determine a search start point corresponding to the first code and may regard a point, which is moved along the search path corresponding to the second code from the search start point, as a matching code. That is, the detailed code may include the first code for setting the start point of the search and the second code for setting the search path from the start point to the matching code depending on the specific search method.

Furthermore, in another embodiment, as the virtual card number generation means 10 (or the virtual card number generation apparatus 100) provides a new virtual card number for each unit count, the virtual card number verification device 200 may set the search start point and the search path based on the first code and the second code changed for each count to search for a matching code.

Furthermore, in another embodiment, to search for the matching code by using a plurality of detailed codes having the correlation, the wallet server selection unit 230 may include the matching code search algorithm. The matching code search algorithm is an algorithm capable of being searching for the matching code when each detailed code included in the virtual matching code is applied. For example, in the case where the virtual card number includes the first code for determining the search start point of the matching code and the second code for presenting the storage location direction from the search start point, when the matching code search algorithm allows a direction to be changed to the direction corresponding to the second code at the point corresponding to the first code, the matching code search algorithm is an algorithm that adjusts the matching code to be positioned at the corresponding location. As the matching code search algorithm is used, even though the first code and the second code included in the virtual card number are changed, the virtual card number verification device 200 may search for the matching code. Various methods may be applied to the matching code search algorithm, and the detailed exemplification will be described with reference to FIGS. 8 and 9. However, the matching code search algorithm is not limited to the exemplification described below.

Furthermore, in another embodiment, the virtual card number verification device 200 further includes a virtual card number verification unit 240. The virtual card number verification unit 240 determines whether the virtual card number received by the virtual card number verification device 200 is authentic.

The virtual card number verification unit 240 may receive and store a unique value (e.g., a matching code) of the virtual card number generation apparatus 100 when a user registers user information in an electronic wallet service.

When the verification server 40 receives the virtual card number, the detailed code extraction unit 220 extracts a plurality of detailed codes from the virtual card number. The virtual card number verification unit 240 may obtain time data at which the virtual card number is generated, based on the detailed code, may extract the unique value of the specific virtual card number generation apparatus 100 stored therein, may apply the extracted unique value together with the time data to the virtual security code generation function (e.g., an OTP function), and may generate the virtual security code. The virtual card number verification unit 240 may determine whether the virtual security code (i.e., the reception virtual security code) received by the virtual card number generation apparatus 100 is the same as the virtual security code (i.e., the generated virtual security code) calculated using the virtual security code generation function stored therein. Because there is a difference between a time point at which the virtual card number generation apparatus 100 generates a virtual card number and a time point at which the virtual card number verification device 200 receives the virtual card number, the virtual card number verification device 200 may calculate the virtual security code (i.e., OTP number) within a specific time range (e.g., from a time point, at which the virtual card number is received, until a specific count) in consideration of a time delay and may determine whether there is a value the same as the reception virtual security code received from the virtual card number generation apparatus 100. When the received virtual security code is the same as the generated virtual security code, the virtual card number verification unit 240 determines that the virtual card number is a normal virtual card number.

Furthermore, in another embodiment, the virtual card number verification unit 240 utilizes the matching code found from the wallet server selection unit 230 to verify the validity of the virtual card number. In particular, when the received virtual security code is the same as the generated virtual security code, the virtual card number verification unit 240 retrieves whether a code the same as the matching code found from the wallet server selection unit 230 is stored in the verification server 40. When the matching code found from the wallet server selection unit 230 is stored in the verification server 40, the virtual card number verification unit 240 determines that the virtual card number is a normal virtual card number.

When the virtual card number verification unit 240 determines that the virtual card number is a normal card number, the communication unit 210 transmits the virtual card number or matching code to the wallet server selected by the wallet server selection unit 230.

Next, the wallet server will be described in detail.

Figure 4:
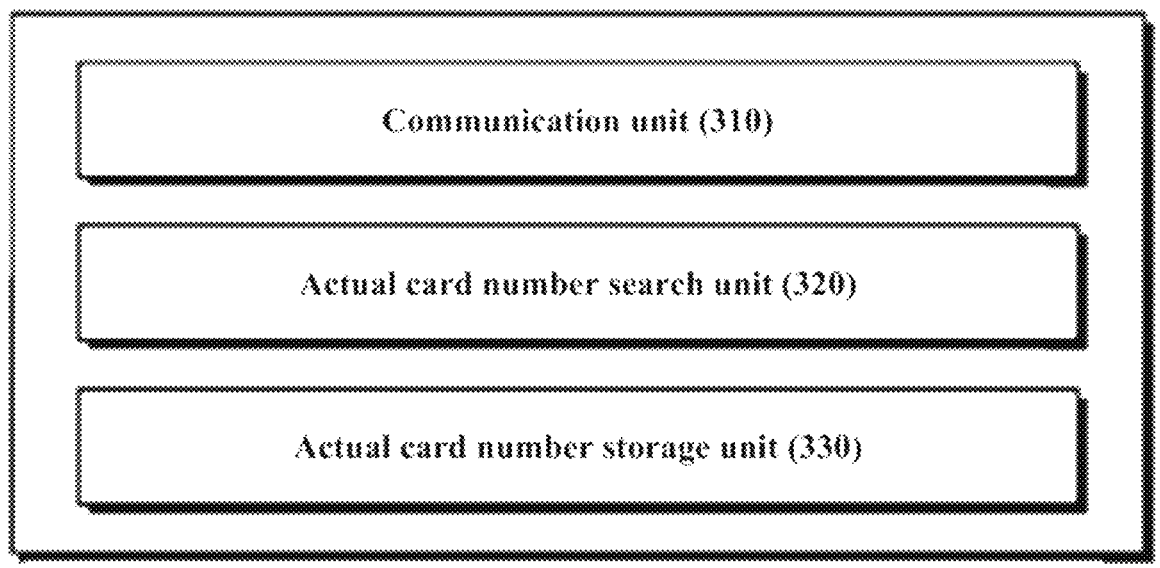
FIG. 4 is a configuration diagram of a wallet server, according to another embodiment of the inventive concept.

FIG. 4 is a configuration diagram of a wallet server 300 according to another embodiment of the inventive concept.

A communication unit 310 receives a virtual card number or matching code from the verification server 40 and transmits an actual card number to the verification server 40.

An actual card number search unit 320 searches for the actual card number stored in a wallet server, using the virtual card number or matching code received from the verification server 40.

In an embodiment, when the communication unit 310 receives a virtual card number from the verification server 40, the actual card number search unit 320 includes a virtual card number verification means. The actual card number search unit 320 extracts one of an actual card number storage location and the storage locations of UID and UID from the virtual card number, using the virtual card number verification means, and then searches for the actual card number.

In another embodiment, when the communication unit 310 receives a matching code from the verification server 40, the matching code may include one of the stored actual card number storage location and the storage location of UID and UID.

When the matching code includes the storage location of the actual card number, the actual card number search unit 320 searches for the actual card number matched with the matching code. On the other hand, when the matching code includes the UID itself, the actual card number search unit 320 searches for the actual card number stored after being matched with the UID, using the matching code. On the other hand, when the matching code includes the storage location of the UID, the actual card number search unit 320 searches for the UID, using the matching code and searches for the actual card number stored after being matched with the UID.

The matching code refers to a code allocated when a virtual card number generation apparatus (e.g., a wearable device) is registered in a wallet server. The allocated matching code is stored in an actual card number storage unit 330 in the wallet server, and is transmitted to the virtual card number generation apparatus and the verification server 40.

Figure 10:
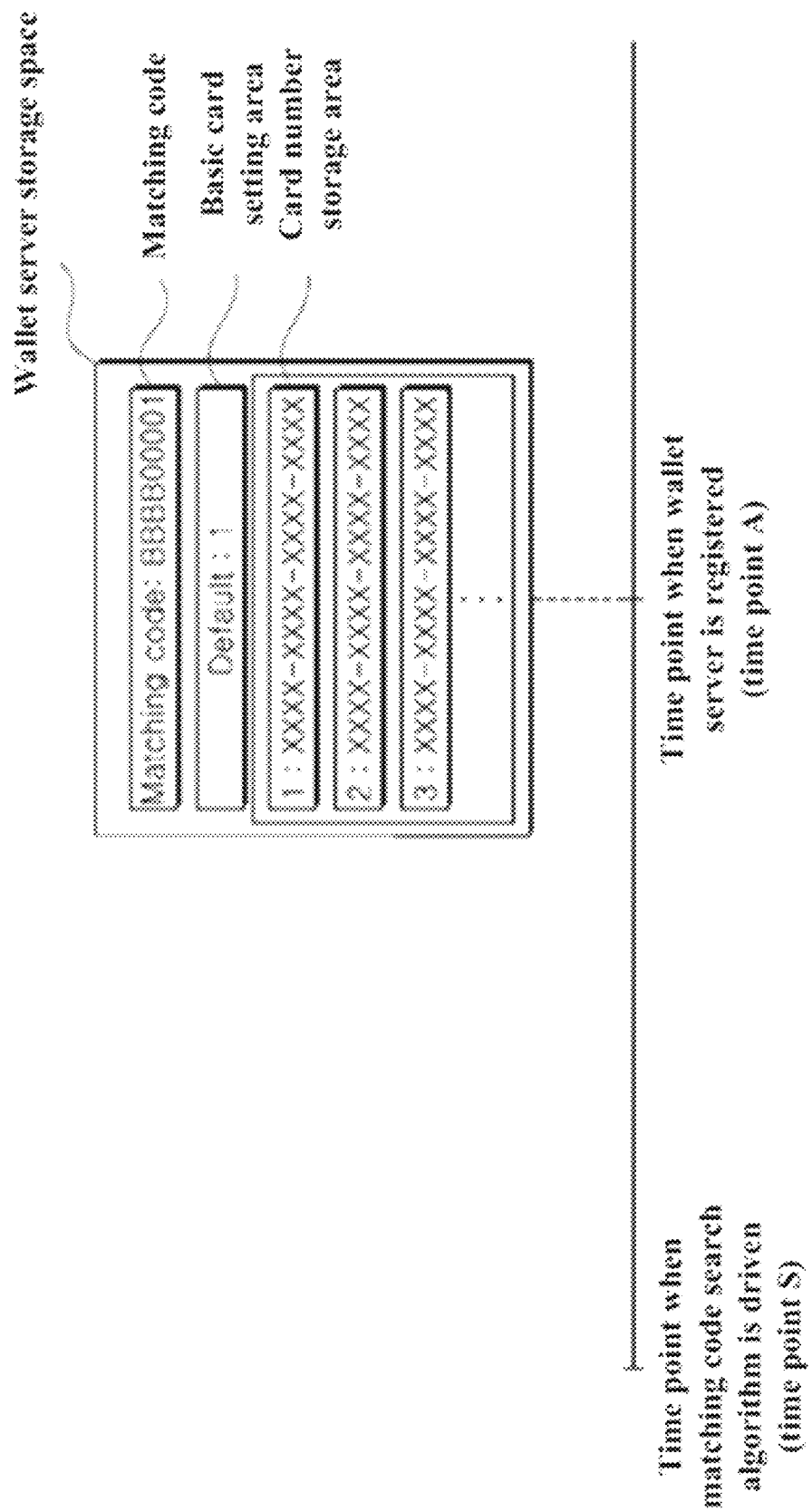
FIG. 10 is an exemplary diagram for describing a wallet server storage space connected to a matching code and an actual card number, according to an embodiment of the inventive concept.

The actual card number storage unit 330 may generate an actual card number storage space for each user or for each virtual card number generation apparatus to store an actual card number. In an embodiment, the actual card number storage unit 330 includes the actual card number storage space in which one or more actual card numbers are stored. Furthermore, as illustrated in FIG. 10, the actual card number storage unit 330 includes a matching code storage area, a basic card setting area, and a card number storage area. A plurality of actual card numbers are stored in the card number storage area after being matched with the identification number; the basic card setting area stores the identification number of the actual card number set as the basic card (or a default card).

As described above, the actual card number is not stored in the verification server 40, but is stored in a wallet server in which a virtual card number generation apparatus is registered. The electronic wallet service user may make a financial transaction using the verification server 40 by registering user information (e.g., an actual card number) in only the corresponding wallet server.

Hereinafter, a financial transaction providing method utilizing the above-described components will be described in detail.

Figure 5:
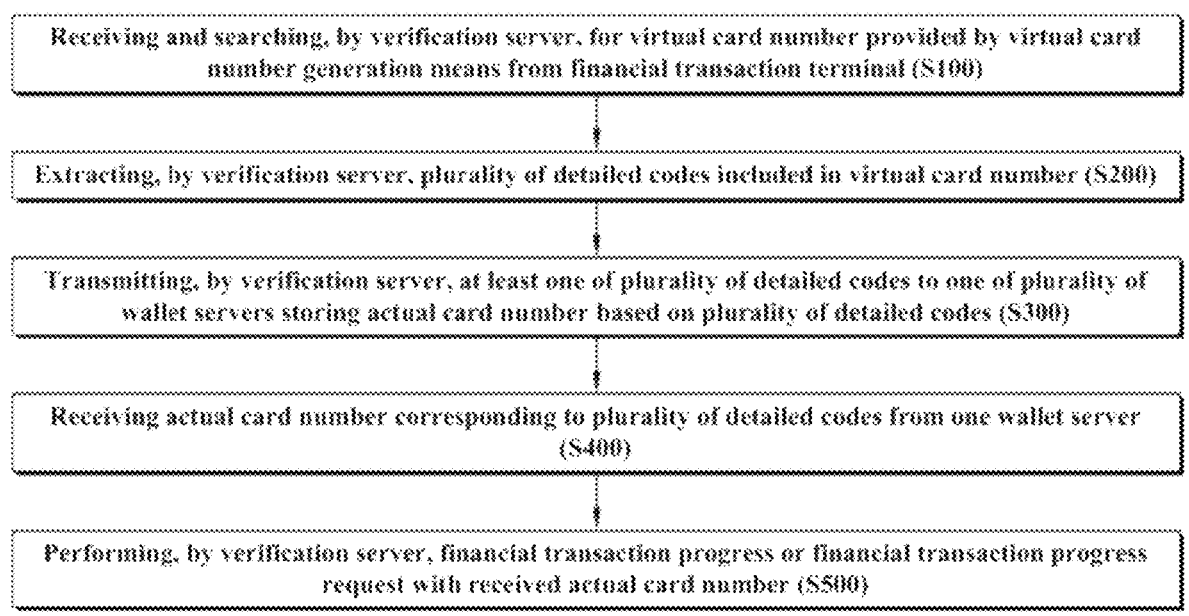
FIGS. 5 to 7 are flow charts of a financial transaction providing method according to an embodiment of the inventive concept.
Figure 6:
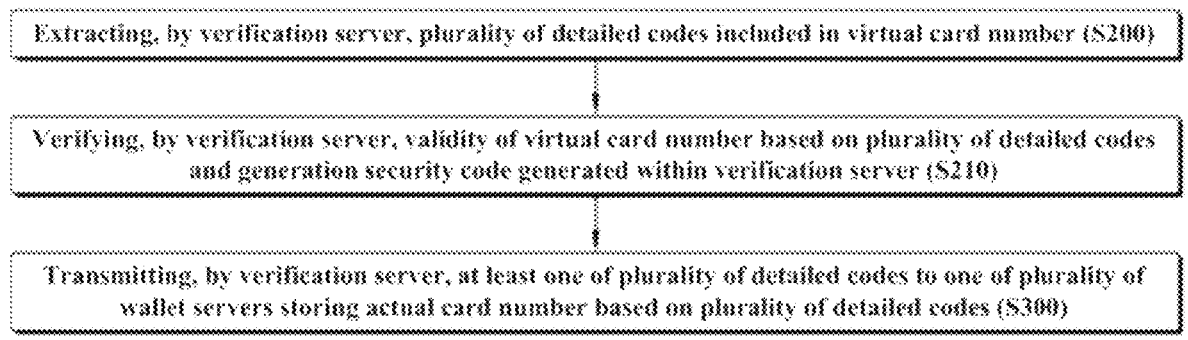
Figure 7:
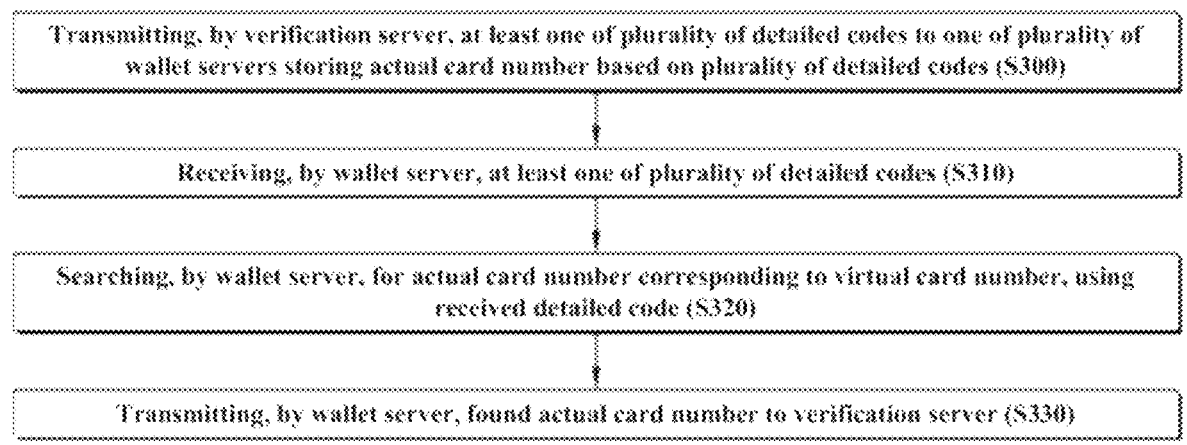

FIGS. 5 to 7 are flow charts of a financial transaction providing method according to an embodiment of the inventive concept.

Referring to FIG. 5, the virtual server number receiving step S100 in which the verification server 40 receives the virtual card number provided by the virtual card number generation means 10 from the financial transaction terminal proceeds.

In an embodiment, the virtual card number generation means 10 may be embedded in a wearable device. The electronic wallet service user may register the wearable device in a wallet server and may install the virtual card number generation program. In the case of making a card payment, the virtual card number generated by the wearable device is delivered to the payment settlement service server 30 through the financial transaction terminal 20; the payment settlement service server 30 transmits the virtual card number to the verification server 40 based on the BIN included in the virtual card number.

In an embodiment, a plurality of wallet servers corresponding to different electronic wallet services may be registered in the verification server 40; all the virtual card numbers generated from the virtual card number generation apparatus 100 registered in each wallet server may include the same BIN. Accordingly, all the virtual card numbers generated from the virtual card number generation apparatus 100 registered in different electronic wallet services are transmitted to the verification server 40.

Afterward, a step S200 in which the verification server 40 extracts a plurality of detailed codes included in the virtual card number proceeds. The plurality of detailed codes are extracted by the detailed code extraction unit 220 included in the verification server 40. To this end, the virtual card number generation apparatus 100 and the verification server 40 may include the same virtual card number generation function. However, an embodiment is not limited thereto, and the verification server may include only the virtual card verification algorithm.

Afterward, a step S300, in which the verification server 40 transmits a virtual card number or matching code to one of a plurality of wallet servers storing the actual card number based on a plurality of detailed codes, proceeds.

In an embodiment, the verification server 40 may search for a matching code by combining the extracted plurality of detailed codes, and may select a wallet server to transmit the detailed code using the found matching code.

Furthermore, in another embodiment, the matching code may consist of a code (4 digits) indicating the wallet server and a code (5 digits) of a user serial number in the wallet server. The verification server 400 may select a wallet server to transmit the matching code, based on a 4-digit code indicating a wallet server in the matching code.

Next, a step S400 of receiving an actual card number corresponding to a plurality of detailed codes from one wallet server proceeds.

Referring to FIG. 7, the wallet server receives at least one (e.g., a matching code) of a plurality of detailed codes extracted from the virtual card number (S310), searches for the actual card number stored in the wallet server using the received detailed code (S320), and transmits the found actual card number to the verification server 40 (S330).

In an embodiment, the wallet server receives the matching code composed of a code (4 digits) indicating the wallet server and a code (5 digits) of a user serial number in the wallet server, from the verification server 40, and then searches for the actual card number storage location using the serial number code. Afterward, the wallet server transmits the found actual card number to the verification server 40.

Furthermore, in another embodiment, the wallet server may receive the actual card storage location from the verification server 40. In this case, the wallet server transmits the actual card number stored in the received actual card storage location to the verification server 40.

Finally, a step S500, in which the verification server 40 performs a financial transaction progress or a financial transaction progress request with the received actual card number, proceeds.

In an embodiment, the verification server 40 transmits the actual card number to the payment settlement service server 30. The payment settlement service server 30 transmits the actual card number to the financial company server 60 corresponding to the BIN based on the BIN included in the actual card number. The financial company server 60 receives the actual card number; when the received actual card number is the same as the actual card number stored in the financial company server 60, the financial company server 60 approves a request for a financial transaction.

In the meantime, in another embodiment, when the virtual card number is not valid, the verification server 40 does not transmit the detailed code extracted from the virtual card number, to the wallet server.

In particular, referring to FIG. 6, a step S200, in which the verification server 40 extracts a plurality of detailed codes included in the virtual card number, proceeds; a step S210, in which the verification server 40 verifies the validity of the virtual card number based on a plurality of detailed codes and the generation security code generated within the verification server, proceeds. A method of verifying the validity of the virtual card number has been specifically described in FIG. 3, and thus a detailed description is omitted.

Only when the received virtual card number is valid, the verification server 40 transmits the extracted detailed code to the wallet server.

As described above, the inventive concept does not register an electronic wallet service in a payment settlement service server, and enables a financial transaction service to be provided through an electronic wallet service.

Hereinafter, specific examples of the first and second codes will be described.

Figure 8:
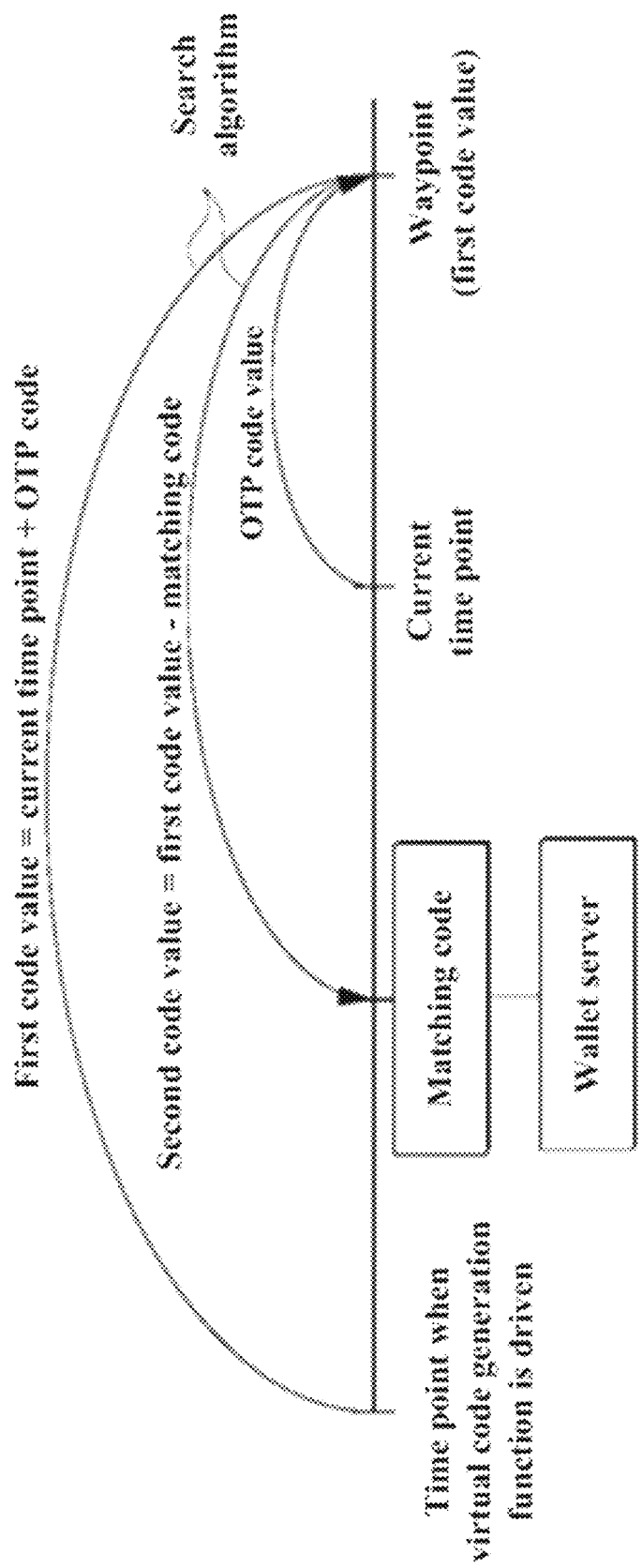
FIG. 8 is an exemplary view illustrating a matching code search algorithm searching for a matching code by moving on a track based on a detailed code, according to an embodiment of the inventive concept.
Figure 9:
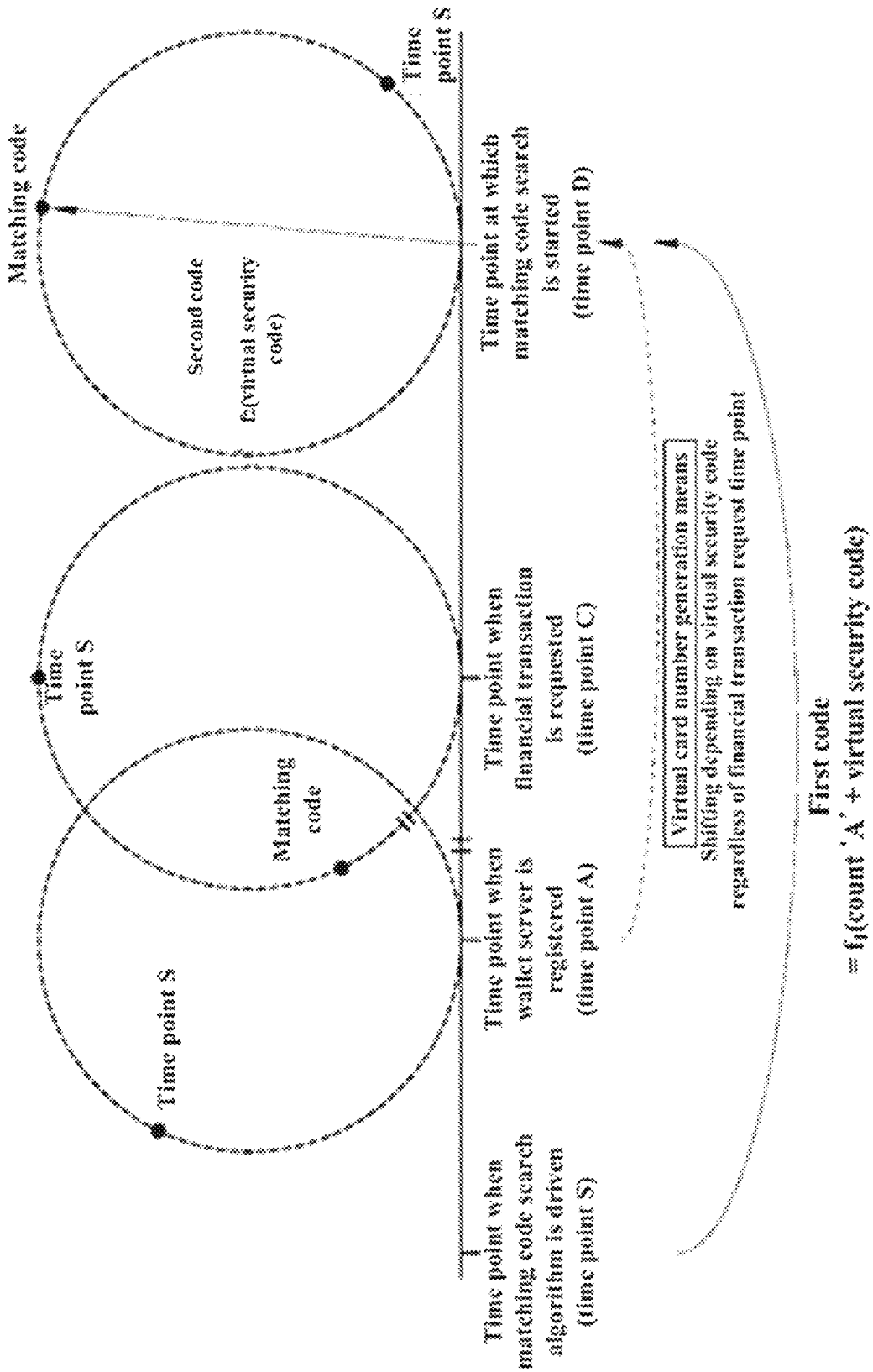
FIG. 9 is an exemplary view of a method of moving a matching code search time point by using a virtual security code, according to an embodiment of the inventive concept.

FIG. 8 is an exemplary view illustrating a matching code search algorithm searching for a matching code by moving on a track based on a detailed code, according to an embodiment of the inventive concept. FIG. 9 is an exemplary view of a method of moving a matching code search time point by using a virtual security code, according to an embodiment of the inventive concept.

In one embodiment, the verification server 40 includes a matching code search algorithm; the matching code search algorithm searches for a matching code by moving on a track based on a plurality of detailed codes constituting a virtual code.

Referring to FIG. 8, the virtual code includes a first code and a second code, as a plurality of detailed codes generated based on a time elapsing from a point in time when the virtual code generation function is driven.

As a specific example of the first code and the second code, the code value (first code value) corresponding to the first code may be a value obtained by adding an OTP code value to the count corresponding to the current time point based on the driving time point of the virtual code generation function. The first code value operates as a waypoint in the actual code search process. The code value (second code value) corresponding to the second code may be a value obtained by subtracting the matching code from the first code value. The second code value is a count from the waypoint (the first code value) to the matching code.

That is, an embodiment of the first code and second code generated by the detailed code generation unit 110 is as follows.

First code=current time count+OTP code

Second code=first code−matching code

The OTP code is a code generated by the OTP code generation function included in the detailed code generation function, and is a code generated at different time points. Accordingly, the detailed code may be generated differently depending on a generation time point of the virtual code, thereby preventing the detailed code from being redundantly generated and enhancing security.

As another specific example of the first code and the second code, the code value (the first code value) corresponding to the first code may be a value obtained by adding the matching code to the OTP code value; the code value (the second code value) corresponding to the second code may be an OTP code value.

That is, another embodiment of the first code and second code generated by the detailed code generation unit 110 is as follows.

First code=OTP code+matching code

Second code=OTP code

As illustrated in FIG. 8, the verification server 40 searches for a matching code by moving along a track in the direction set by the count corresponding to the second code value, via the count on the track matched with the first code value as the waypoint.

Furthermore, in another embodiment, the first code and the second code may be codes for the reference count added by the OTP code generated randomly from a time point (e.g., a time point at which the virtual card number generation means generates a virtual card number) at which the virtual card number generation apparatus is registered by the wallet server or a time point at which a financial transaction is requested.

As the detailed embodiment, a virtual card number generating means generates the virtual security code by reflecting the virtual security code to the first code and the second code, without outputting the virtual security code to the outside. As illustrated in FIG. 8, the virtual card number generating means 10 generates a virtual security code value (e.g., OTP code) based on the matching code stored in a virtual card number generating apparatus, and generates the first code of a count, to which the virtual security code value is added, at a registration time point of the virtual card number generation apparatus, and generates the second code of the count corresponding to the virtual security code value (i.e., generating the virtual security code itself as the second code). That is, the first code and the second code are generated based on the count shifted by the value of the virtual security code from a time point 'A' at which the virtual card number generation apparatus is registered in the wallet server. The count shifted from the time point 'A' may be a count earlier or later than the count corresponding to the current time point depending on the generated virtual security code value. The verification server 40 may search for the matching code by applying the received first code and second code to the matching code search algorithm. As such, it is impossible for other people to identify the order in which the first code and the second code constituting the virtual card number are provided, thereby improving the security.

The steps of a method or algorithm described in connection with the embodiments of the inventive concept may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the inventive concept pertains.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

The inventive concept has the following various effects.

First, according to an embodiment of the inventive concept, because a virtual card number (or matching code extracted from the virtual card number) generated from a virtual card number generation apparatus is delivered through a verification server to a wallet server for providing electronic wallet service, the electronic wallet service does not require a separate Bank Identification Number (BIN) from a payment settlement service company to provide a financial transaction service to a user. Accordingly, a system establishment cost for providing an electronic wallet service may be reduced.

Second, according to an embodiment of the inventive concept, it is possible to provide a plurality of different electronic wallet services by receiving a single BIN. Accordingly, a system establishment cost for providing an electronic wallet service may be reduced.

Third, according to an embodiment of the inventive concept, the virtual code generation function is stored in only the virtual card number generation apparatus and verification server; the algorithm for searching for a matching code for a wallet server storing the actual card number is embedded in only the verification server; the actual card number is stored in only the wallet server; accordingly, it is possible to prevent an algorithm for generating and verifying the virtual card number, and the actual card number from leaking out.

The effects of the present inventive concept are not limited to the aforementioned effects, and other effects not mentioned herein will be clearly understood from the following description by those skilled in the art to which the inventive concept pertains.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A virtual card number-based financial transaction providing method, comprising:
   receiving, by a verification server, a bank identification number (BIN), from a payment settlement service server;
   receiving, by the verification server, a virtual card number including the BIN, from the payment settlement service server;
   extracting, by the verification server, a plurality of detailed codes included in the virtual card number, wherein the plurality of detailed codes include a user identifier (UID) indicating user allocation location;
   searching, by the verification server, for a matching code corresponding to the plurality of detailed codes, wherein the verification server stores the matching code in a particular location allocated to a particular user in a virtual card number verification algorithm stored in the verification server, and the matching code includes link information to a particular wallet server among a plurality of wallet servers storing an actual card number;

transmitting, by the verification server, the virtual card number or the matching code to the particular wallet server storing the actual card number, based on the matching code;

receiving, by the verification server, the actual card number corresponding to the virtual card number from the particular wallet server; and transmitting, by the verification server, a financial transaction progress or a financial transaction progress request, with the received actual card number, to the payment settlement service server.

2. The virtual card number-based financial transaction providing method of claim 1, wherein the virtual card number further includes a fixed code coupled at a predetermined location within the virtual card number and matched with the verification server, and the plurality of detailed codes.

3. The virtual card number-based financial transaction providing method of claim 2, wherein the verification server transmits the virtual card number to the particular wallet server, and wherein the particular wallet server additionally verifies the virtual card number.

4. The virtual card number-based financial transaction providing method of claim 2, wherein the verification server transmits the matching code to the particular wallet server.

5. The virtual card number-based financial transaction providing method of claim 4, wherein the matching code further includes a storage location of the actual card number stored in the particular wallet server, or the UID stored in the particular wallet server.

6. The virtual card number-based financial transaction providing method of claim 2, further comprising:
   verifying, by the verification server, validity of the virtual card number, based on the plurality of detailed codes and a generation security code generated in the verification server,
   wherein the transmitting, by the verification server, of the virtual card number or the matching code to the particular wallet server is performed only when the virtual card number is valid.

7. The virtual card number-based financial transaction providing method of claim 2, wherein a first virtual card number and a second virtual card number include the same fixed code such that the first virtual card number formed based on a first matching code matched with the particular wallet server of the plurality of wallet servers, and the second virtual card number formed based on a second matching code matched with another particular wallet server of the plurality of wallet servers are transmitted to the verification server.

8. The virtual card number-based financial transaction providing method of claim 2, wherein the virtual card number is generated by a user terminal, and wherein the user terminal is registered in the particular wallet server of the plurality of wallet servers.

9. The virtual card number-based financial transaction providing method of claim 8, wherein the user terminal registered in the particular wallet server of the plurality of wallet servers, and another user terminal registered in another particular wallet server of the plurality of wallet servers generate the virtual card number including the same fixed code.

10. A non-transitory computer readable recording medium storing software that, when executed by hardware of a verification server, causes the hardware of the verification server to perform operations comprising:

receiving a bank identification number (BIN), from a payment settlement service server;

receiving a virtual card number including the BIN, from the payment settlement service server;

extracting a plurality of detailed codes included in the virtual card number, wherein the plurality of detailed codes include a user identifier (UID) indicating user allocation location;

searching for a matching code corresponding to the plurality of detailed codes, wherein the verification server stores the matching code in a particular location allocated to a particular user in a virtual card number verification algorithm stored in the verification server, and the matching code includes link information to a particular wallet server among a plurality of wallet servers storing an actual card number;

transmitting the virtual card number or the matching code to the particular wallet server storing the actual card number, based on the matching code;

receiving the actual card number corresponding to the virtual card number from the particular wallet server; and transmitting a financial transaction progress or a financial transaction progress request, with the received actual card number, to the payment settlement service server.

11. A virtual card number-based financial transaction providing apparatus, comprising:
   a communication unit configured to:
      receive a bank identification number (BIN), from a payment settlement service server; and
      receive a virtual card number including the BIN, from the payment settlement service server;
   a detailed code extraction unit configured to:
      extract a plurality of detailed codes included in the virtual card number, wherein the plurality of detailed codes include a user identifier (UID) indicating user allocation location; and
      search for a matching code corresponding to the plurality of detailed codes, wherein the matching code includes link information to a particular wallet server among a plurality of wallet servers storing an actual card number;
   a non-transitory storage configured to:
      store the matching code in a particular location allocated to a particular user in a virtual card number verification algorithm stored in the non-transitory storage; and
   a wallet server selection unit configured to:
      select the particular wallet server storing the actual card number, based on the matching code; and
      transmit, via the communication unit, the virtual card number or the matching code to the particular wallet server storing the actual card number based on the matching code,
   wherein the communication unit is further configured to:
      receive the actual card number corresponding to the virtual card number from the particular wallet server; and
      transmit a financial transaction progress or a financial transaction progress request with the received actual card number, to the payment settlement service.

12. The virtual card number-based financial transaction providing apparatus of claim 11, wherein the virtual card number further includes a fixed code coupled at a predetermined location within the virtual card number and matched with the virtual card number-based financial transaction providing apparatus, and the plurality of detailed codes.

13. The virtual card number-based financial transaction providing apparatus of claim 11, further comprising:
    a virtual card number verification unit configured to verify validity of the virtual card number based on the plurality of detailed codes.

\* \* \* \* \*